United States Patent
Neumann

(10) Patent No.: US 7,258,013 B2
(45) Date of Patent: Aug. 21, 2007

(54) DEVICE AND METHOD TO MEASURE A BEARING SYSTEM

(75) Inventor: Rudolf Neumann, Spaichingen (DE)

(73) Assignee: Minebea Co., Ltd., Nagano-ken (JP)

( * ) Notice: Subject to any disclaimer, the term of this patent is extended or adjusted under 35 U.S.C. 154(b) by 119 days.

(21) Appl. No.: 11/117,172

(22) Filed: Apr. 27, 2005

(65) Prior Publication Data

US 2005/0274190 A1    Dec. 15, 2005

(30) Foreign Application Priority Data

Apr. 27, 2004   (DE) .................. 10 2004 020 752

(51) Int. Cl.
*G01L 73/70* (2006.01)
(52) U.S. Cl. ..................................... 73/700
(58) Field of Classification Search ................. 73/700, 73/718, 724, 730, 756, 706; 310/90.5; 33/502
See application file for complete search history.

(56) References Cited

U.S. PATENT DOCUMENTS

| | | | | |
|---|---|---|---|---|
| 4,227,420 A | * | 10/1980 | Lamadrid | .................. 73/756 |
| 5,032,751 A | * | 7/1991 | Morita | ...................... 310/90.5 |
| 6,463,667 B1 | * | 10/2002 | Ushio et al. | .................. 33/502 |
| 2002/0083779 A1 | | 7/2002 | Narita et al. | |

FOREIGN PATENT DOCUMENTS

| GB | 1 544 967 | 4/1979 |
|---|---|---|
| GB | 1 573 682 | 8/1980 |
| JP | 06137997 A | 5/1994 |

* cited by examiner

*Primary Examiner*—Jewel Thompson
(74) *Attorney, Agent, or Firm*—The Maxham Firm

(57) ABSTRACT

A device to measure a fluid dynamic bearing system, particularly the inside diameter of the bearing bore of a bearing sleeve or the outside diameter of a shaft using a sensor element. A capacity acting sensor element is used to determine, for example, the inside diameter of the bearing bore, the sensor element being designed as part of the surface of a shaft prepared for measurement purposes. To determine the outside diameter of the shaft, the sensor element is correspondingly designed as part of the surface of the bearing bore of a bearing sleeve prepared for measurement purposes. Means of introducing a measuring fluid, preferably compressed air, into the bearing gap remaining between the bearing sleeve and the shaft are provided so that during the measurement process the shaft is automatically aligned and centered within the bearing bore.

19 Claims, 1 Drawing Sheet

DEVICE AND METHOD TO MEASURE A BEARING SYSTEM

FIELD OF THE INVENTION

The invention relates to a device and a method to measure a fluid dynamic bearing system, particularly the surface topology of the bearing bore or the shaft, and to measure the diameters of the bearing bore and of the shaft in such a bearing system.

DISCUSSION OF PRIOR ART

In one example, to measure a bearing system and, in particular, the inside diameter of the bearing sleeve of a fluid dynamic bearing (FDB) with respect to the dimensional accuracy of the bore, an air gauge is inserted into the bearing sleeve in a similar manner as described in JP 06137997 A. The pressure drop in the air bearing thus created is measured by means of the air gauge. Air is used as the measuring fluid. Here, the pressure drop as a measurement is a gauge for the size of the bearing gap. In this prior, to increase the measurement resolution three successive points extending in an axial direction are provided on the shaft at which the compressed air is radially discharged. Moreover, both the shaft and the bearing sleeve can be put into rotation with respect to each other during the measuring process.

A significant disadvantage of using this kind of measurement is that it provides very little information on the exact shape of the inside diameter of the bearing being measured. This means, for instance, that local deviations cannot be determined since the measurement has a quasi integrative effect. An advantage of this measuring method is the comparatively short time required to carry out the measurement.

An alternative non-contactless method of measuring the inside diameter of a bearing sleeve is by using a mechanical measuring probe. A measuring device of this kind has, for example, a thin needle on one end of which a sapphire ball is typically placed. This ball has to be very small so that it can be inserted into bores of about 2-3 mm or less. Although this kind of measurement is comparatively precise, having measuring accuracies within the micrometer range, it is firstly a lengthy process and secondly, the inside of the bore being measured might be scratched through contact during measurement. What is more, in such a case the bearing and the measuring device have to be positioned with respect to each other in a complicated process and any deviations in positioning result in measurement errors in that, for example, the inside circumference of the bearing bore is not measured axially but rather along a spiral path.

In addition, optical sensors that work on the triangulation principle are known for the measurement of bores. A significant disadvantage of this method is that the wall of the bore has to be reflective in order to achieve a measurement result.

As in all known measuring methods, there is also the problem that any misalignment of the sensor body within the bore results in errors of measurement.

SUMMARY OF THE INVENTION

A purpose of this invention is to provide a device and a method to measure a fluid dynamic bearing system, particularly the surface topology of a bearing bore or the shaft, or both, in particular, to gauge the diameters of the bearing bore and of the shaft, in which measurement errors caused by misalignment of the measurement sensor can be largely avoided.

The invention is based on the fact that a specially prepared air gauge is employed as an air bearing which is used to position a capacitive sensor integrated in the air gauge. By using compressed air as the measuring fluid, the air gauge can more or less align itself within the bearing sleeve. Furthermore, a single capacity probe area of the capacitive sensor can be provided, for example, and the FDB and the air gauge can be moved with respect to each other during measurement, either through the rotation of the air gauge or of the bearing sleeve or also through a change in the axial positioning of the air gauge within the bearing sleeve. As an alternative, an array of capacity probe areas can be provided on the surface of the air gauge. This array can be electronically read out and the measured values of the individual capacitive sensors can be mathematically processed.

As an alternative to the above measurement task and taking an equivalent form, it is possible to measure the outside diameter of a shaft in that a bearing sleeve provided with one or more capacitive sensors and pressurized with compressed air is positioned about the shaft being measured. The compressed air is fed into the bearing gap via air conduction channels which run within the shaft or the bearing sleeve and which are supplied from a compressed air source.

Due to the degree of accuracy made possible by the invention in aligning the shaft with respect to the bearing sleeve and also due to the measuring accuracy of the capacitive sensor elements, it is possible not only to readily measure the outside diameter or the inside diameter of a shaft or of a bearing bore respectively but also to probe the surface topology of the bearing bore or the shaft.

BRIEF DESCRIPTION OF THE DRAWING

An exemplary embodiment of the invention is explained below on the basis of the drawing, in which the single FIGURE shows a longitudinal section through a fluid dynamic bearing to be measured.

DETAILED DESCRIPTION OF THE PREFERRED EMBODIMENTS

Figure 1:
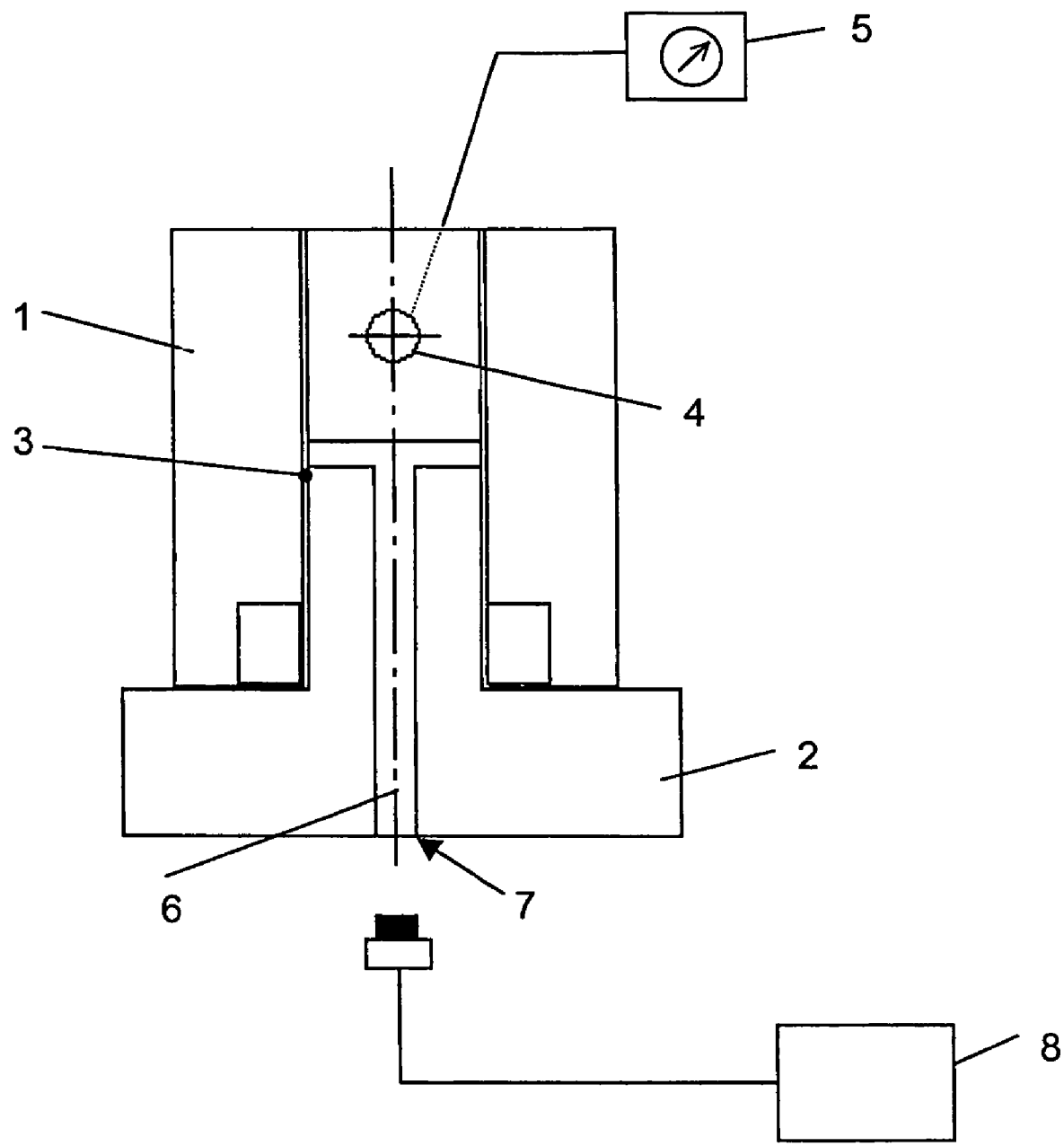

The bearing comprises bearing sleeve 1 having a concentric bearing bore. In the illustrated embodiment, it is the inside diameter of the bearing bore that is to be measured. In a known method, the bearing bore accommodates shaft 2 whose diameter is slightly smaller than the inside diameter of the bearing bore. This means that between bearing sleeve 1 and shaft 2 there remains bearing gap 3 in which a fluid, such as air, is found. When the fluid in the bearing gap is put under pressure, the bearing becomes capable of carrying a load.

According to the inventions shaft 2 is now specially prepared as an air gauge and is inserted into the bearing bore for measurement purposes. At its outer circumference, air gauge 2 includes capacitive sensor element 4 taking the form of an annular capacity probe area. Capacity probe area 4 is made of a conductive material and, together with the conductive bore wall of bearing sleeve 1, it forms a capacitor whose capacity is measured by measuring device 5 connected to capacity probe area 4. The measured capacity depends on the spacing between the capacity probe area and the inside surface of the bearing bore. The diameter of the bearing bore can then be determined from this.

For measurement purposes, it is important that sensor element 4 is aligned and centered within the bearing bore. Since the sensor element is integrated in shaft 2, alignment can be achieved according to the invention by centering shaft 2 within the bearing bore. The shaft is centered within the bearing bore by compressed air being blown into bearing gap 3 during the measuring process. The compressed air or the pressure is evenly distributed in the bearing gap which results in shaft 2 being aligned very precisely within bearing sleeve 1.

To introduce compressed air into bearing gap 3, air conduction channel 6, for example, is provided in shaft 2, the air conduction channel starting at an axial end of the shaft and ending in the bearing gap about halfway along the axial length of the bearing. Using a compressed air source 8, the compressed air is fed to intake 7 of air conduction channel 6 and blown into the bearing gap.

This method makes it possible to not only measure diameters but also to compile topologies of the measured bearing components.

An exemplary embodiment of the present invention has been shown and described. Modifications and improvements will likely occur to those skilled in this technical field that are within the scope of the invention as contemplated. The invention is to be limited only by the scope of the appended claims and equivalents thereto.

What is claimed:

1. A device to measure the inside diameter of the bearing bore of a bearing sleeve of a fluid dynamic bearing system having a shaft inside the sleeve and a bearing gap between the shaft and the sleeve, the device comprising:
   a measuring element comprising a capacity measuring sensor element that is configured as a part of the surface of the shaft prepared for measurement purposes; and
   means to introduce a fluid into the bearing gap between the bearing sleeve and the shaft, whereby during the measurement process the shaft is self-aligned and centered within the bearing bore.

2. A device to measure the outside diameter of a shaft of a fluid dynamic bearing system having the shaft inside a bearing sleeve and a bearing gap between the shaft and the sleeve, the device comprising:
   a measuring element comprising a capacity measuring sensor element that is configured as a part of the surface of the bearing bore of the bearing sleeve prepared for measurement purposes; and
   means to introduce a fluid in the bearing gap between the bearing sleeve and the shaft, whereby during the measurement process the shaft is self-aligned and centered within the bearing bore.

3. The device according to claim 1, wherein the fluid introduced into the bearing gap is compressed air.

4. The device according to claim 2, wherein the fluid introduced into the bearing gap is compressed air.

5. The device according to claim 1, and further comprising a plurality of sensor elements arranged and distributed selectively in an axial direction and along the circumference selectively of the shaft and of the bearing bore, thereby allowing the bearing system to be measured simultaneously at several axial positions.

6. The device according to claim 2, and further comprising a plurality of sensor elements arranged and distributed selectively in an axial direction and along the circumference selectively of the shaft and of the bearing bore, thereby allowing the bearing system to be measured simultaneously at several axial positions.

7. The device according to claim 3, and further comprising a plurality of sensor elements arranged and distributed selectively in an axial direction and along the circumference selectively of the shaft and of the bearing bore, thereby allowing the bearing system to be measured simultaneously at several axial positions.

8. The device according to claim 4, and further comprising a plurality of sensor elements arranged and distributed selectively in an axial direction and along the circumference selectively of the shaft and of the bearing bore, thereby allowing the bearing system to be measured simultaneously at several axial positions.

9. The device according to claim 1, and further comprising means for rotating the shaft and bearing sleeve with respect to each other at least during measurement.

10. The device according to claim 2, and further comprising means for rotating the shaft and bearing sleeve with respect to each other at least during measurement.

11. The device according to claim 1, and further comprising air conduction channels within the shaft that end in at least one opening at the circumference of the shaft.

12. The device according to claim 2, and further comprising air conduction channels within the shaft that end in at least one opening at the circumference of the shaft.

13. The device according to claim 1, and further comprising air conduction channels within the bearing sleeve that end in at least one opening at the inside circumference of the bearing bore.

14. The device according to claim 2, and further comprising air conduction channels within the bearing sleeve that end in at least one opening at the inside circumference of the bearing bore.

15. A method to selectively measure the outside diameter of a shaft and the inside diameter of a bearing bore within a bearing sleeve in a fluid dynamic bearing system, the method comprising:
    taking the measurement by means of a capacity measuring sensor element; and
    introducing a measuring fluid into a bearing gap between the bearing sleeve and the shaft so that at least for the duration of the measurement the shaft is self-aligned and centered within the bearing sleeve.

16. The method according to claim 15, wherein the measuring fluid introduced into the bearing gap is compressed air.

17. The method according to claim 15, and further comprising rotating the shaft and the bearing sleeve with respect to each other during measurement.

18. The method according to claim 16, wherein the compressed air is introduced into the bearing gap by means of an air conduction channel selectively disposed in the shaft and in the bearing sleeve.

19. The method according to claim 15, and further comprising selectively measuring the surface topology of the bearing bore and the shaft.

* * * * *